United States Patent [19]

Ishizawa et al.

[11] Patent Number: 5,347,630
[45] Date of Patent: Sep. 13, 1994

[54] COMPUTER SYSTEM HAVING A DETACHABLE DISPLAY

[75] Inventors: Shoichi Ishizawa; Kyoichi Ideno, both of Suwa, Japan

[73] Assignee: Seiko Epson Corporation, Tokyo, Japan

[21] Appl. No.: 860,738

[22] Filed: Mar. 25, 1992

[30]  Foreign Application Priority Data

Apr. 23, 1991 [JP] Japan ................................. 3-092227

[51] Int. Cl.⁵ ............................................. G06F 3/147
[52] U.S. Cl. .................................. 395/164; 345/203; 361/681
[58] Field of Search ................. 395/162, 164; 364/708, 364/708.1; 345/185, 203; 361/681

[56]  References Cited

U.S. PATENT DOCUMENTS 3,592,527  7/1971  Conners et al. ....................... 350/160
5,138,565  8/1992  Satou .................................... 364/708

FOREIGN PATENT DOCUMENTS 0149762  11/1984  European Pat. Off. .
0371383  11/1989  European Pat. Off. .
0395033   4/1990  European Pat. Off. .
2235797   8/1990  United Kingdom .

*Primary Examiner*—Robert L. Richardson
*Attorney, Agent, or Firm*—Spensley Horn Jubas & Lubitz

[57]  ABSTRACT

An information processing apparatus such as a personal computer or a word processor is disclosed. A main unit includes at least processing means for processing input data, and main unit memory means connected to the processing means. A display device is attachable to and detachable from the main unit case and includes at least display device memory means for storing data of the main unit supplied through a connector to be connected to a main unit connector when attached, display means for displaying the stored content, control means for controlling the display and power supply means for supplying powers to the display device memory means, the display device and the control means when detached.

18 Claims, 6 Drawing Sheets

COMPUTER SYSTEM HAVING A DETACHABLE DISPLAY

BACKGROUND OF THE INVENTION

1. Field of the Invention

The present invention relates to an information processing equipment such as a personal computer or a word processor.

2. Related Background Art

A personal computer comprises a main unit including an input device such as a keyboard, a CPU (ROM and RAM), and a display device such as a liquid crystal display mounted on a front panel of a cover hinged to the main unit. As the electronic technologies and the packaging technologies advance, the personal computer has been remarkably reduced in its size and weight and has become suitable to carry.

However, a relatively large component such as a keyboard is essential to the personal computer. Further, in order to enhance the function, it is required to build in a floppy disk drive. Accordingly, there is a limit in reducing the size and the weight. In order to remarkably reduce the size and the weight of the personal computer., the keyboard may be constructed by a sheet-like input panel. In this case, however, the operability is poor and the utility is lost by the size reduction.

SUMMARY OF THE INVENTION

In the light of the above, it is an object of the present invention to provide an information processing apparatus which materially enhances the portability while maintaining high operability.

The information processing apparatus of the present invention comprises a main unit and a display device. The main unit includes at least processing means for processing input data and main unit memory means connected to the processing means. The display device is attachable to and detachable from the main unit case and includes at least display device memory means for storing data of the main unit supplied through a connector to be connected with a main unit connector when attached, display means for displaying the content of the memory means, control means for controlling the display and power supply means for supplying powers to the display device memory means, the display means and the control means when detached.

In accordance with the present invention, when the display device is attached, the data of the main unit is sent to the display device memory means, and when it is detached, the stored data is displayed by the display means while it is supplied from the separate power supply means.

It is a further object of the present invention to provide an information processing apparatus comprising a main unit including at least processing means for processing input data and main unit memory means connected to said processing means, and a display device attachable to and detachable from said main unit and including at least a display device memory means for storing data of said main body supplied through a connector to be connected with a main unit connector when attached, display means for displaying a content of said display device memory means, control means for controlling the display of said display means and power supply means for supplying powers to said display device memory means, said display means and said control means when detached.

Still further, it is an object of the present invention to provide an information processing apparatus comprising a main unit including at least processing means for processing input data and main unit memory means connected to said processing means and a display device attachable to and detachable from said main unit case and including at least display means for displaying data supplied from said main unit and maintaining said data when attached and control means for controlling the display of said display means.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art form this detailed description.

DESCRIPTION OF THE PREFERRED EMBODIMENT

Figure 1:
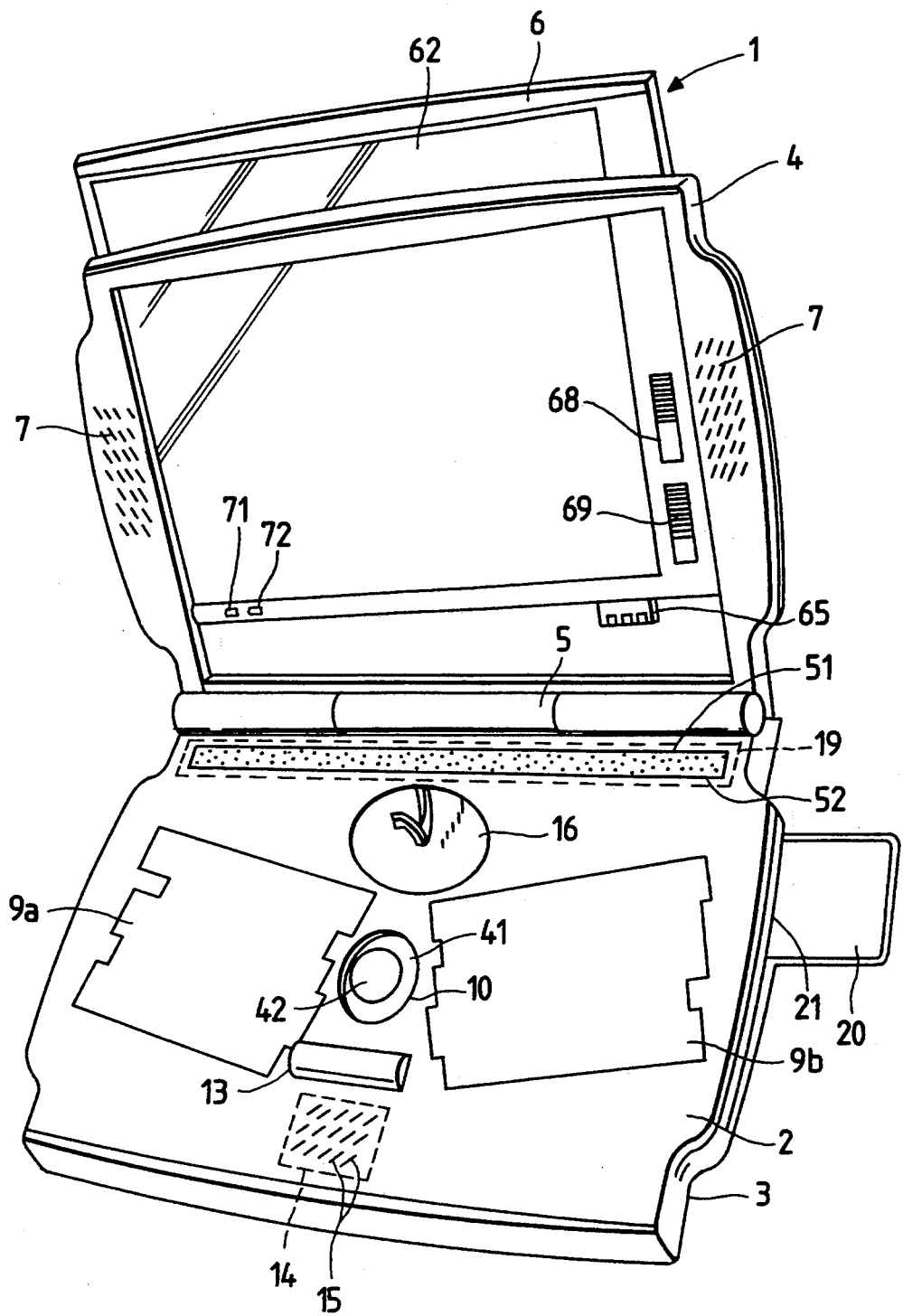
FIG. 1 shows a perspective view of a personal computer in an embodiment.

Embodiments of the present invention are now explained in detail with reference to the accompanying drawings. FIG. 1 shows a perspective view of an embodiment of the information processing apparatus.

In FIG. 1, a personal computer 1 comprises a personal computer main unit 3 having a keyboard on top thereof and a cover 4 of the personal computer main unit 3, and it is generally rectangular and thin. The cover 4 is pivotally coupled to the personal computer main body 3 through a hinge 5 at a rear edge of the keyboard 2, and it is used in an upstanding position during the operation. The cover 4 includes a display device 6 which is a liquid crystal display and a pair of audio output speakers arranged on the left and right side of the display device 6. Stereo-sounding is provided by the speakers 7. The display device 6 is attachable to and detachable from the cover 4. Equipments such as CPU, RAM, ROM, and I/O interface are built in the personal computer main unit 3 and they are interconnected by a data bus, an address bus and control lines to configure a computer. An input device is arranged on the keyboard 2 in the following manner. A plurality of input keys are divided into two left and right input key groups 9a and 9b and they are arranged in a substantially mid-position between the rear edge and the front edge of the keyboard 2 laterally symmetrically with respect to a center line X of the keyboard 2 and spaced from a predetermined distance from the center line X. The input key group 9a on the left of the center line X is inclined with the left corner thereof up with respect to the front edge of the keyboard 2, and the key group 9b on the right of the center line X is inclined with the right corner thereof down with respect to the front edge of the keyboard 2. A left hand of a human tends to incline toward right-front and a right hand tends to incline toward left front because of a physical structure of a shoulder and an arm. Accordingly, by arranging the input key groups 9a and 9b in the manner described above, it is not necessary to bend a wrist in a horizontal plane to input data, and the input operation can be functionally attained.

A track ball input device 10 which is a pointing input device is arranged on the center line X of the keyboard 2 between the left and right input key groups 9a and 9b. In this area, a circular mount groove 41 is formed in the surface of the keyboard 2 and a spherical track ball 42 is removably housed in the mount groove 41. The movement of a cursor on the display 4 is directed by the rotation of the track ball 42 in the mount groove 41. Since the track ball 42 which is used with the input key 8 in the input operation is arranged between the left and right key groups 9a and 9b, the track ball 42 may be manipulated by either the left hand or the right hand during the operation of the track ball input device 10. This enables the simultaneous manipulation of the track ball 42 and the input key 8.

As shown in FIG. 1, a palm rest 13 which is a rectangular projection extending perpendicularly to the center line X on the keyboard 2 is arranged on the center line X in front of the track ball 42. By resting a plan on the palm rest 13, the manipulation of the track ball 42 is stabilized and exact operation is assured. A microphone 14 which is a voice input device is arranged on the center line X in front of the palm rest 13. An internal device of the microphone 14 is accommodated in the personal computer main unit 3 below the keyboard 2. A slit 15 for the microphone is formed in the surface of the keyboard 2. An operator may input voice to the personal computer 1 through the microphone 14.

A parabola antenna 18 which is an electromagnetic wave transmitting and receiving device is arranged behind the input key groups 9a and 9b, on the center line X of the keyboard 2. The parabola antenna 1 is connected to a bus 11 of the computer circuit through a communication interface (not shown). A paper feed port 51 and a paper eject port 52 of a printer 19 are arranged behind the parabola antenna 16 and in front of the hinge 5 of the display 4. Components of the printer 19 are accommodated in this area of the personal computer main unit 3. A slot 21 for accommodating an IC card 20 is formed on a right side of the personal computer main unit 3.

Figure 2A:
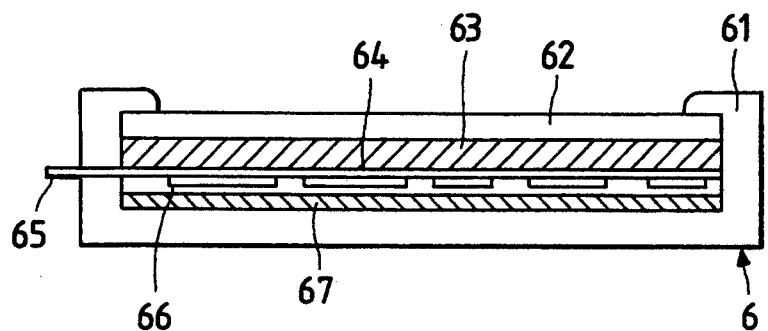
FIGS. 2(a) and 2(b) respectively show a front view and a sectional view of a display device in the embodiment.
Figure 2B:
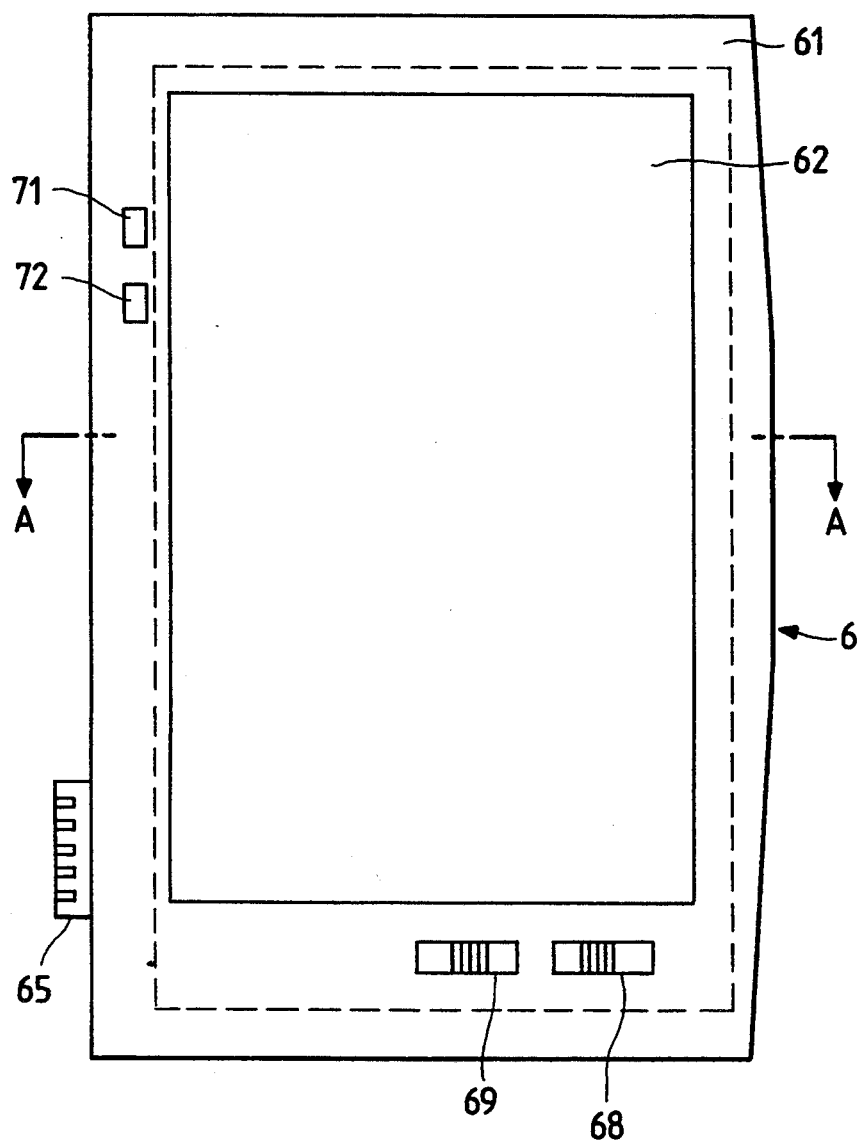

FIGS. 2A and 2B show a construction of the display device 6 shown in FIG. 1. FIG. 2B shows a front view and FIG. 2A shows an A—A sectional view. As shown, a liquid crystal (LC) display panel 62 in secured to a front panel of a display frame 81, and a backlight device 63 is arranged on a rear panel of the display frame 61. The backlight device 63 contains a light source and a light diffusion plate (not shown). A circuit board 64 is arranged behind the backlight device 63, and an end thereof projects from the display frame 61 to function as a display device connector 65. Circuit components 66 such as IC's are mounted on the circuit board 64, and a sheet battery (for example, a Ni-Cd battery) 67 is mounted on a rear surface. A backlight controller 68 for controlling a brightness of the backlight device 63 and a contrast controller 69 for controlling a contrast of the display panel 62 are arranged on a right side of the display frame 61, and a backlight switch sw 71 for turning on and off the backlight device 63 and a display switch sw 72 for turning on and off the display panel 62 are arranged on a lower side of the display frame 61. An outer area of the display frame 61 shown by broken line is not seeable when it is mounted on the cover 4.

Figure 3:
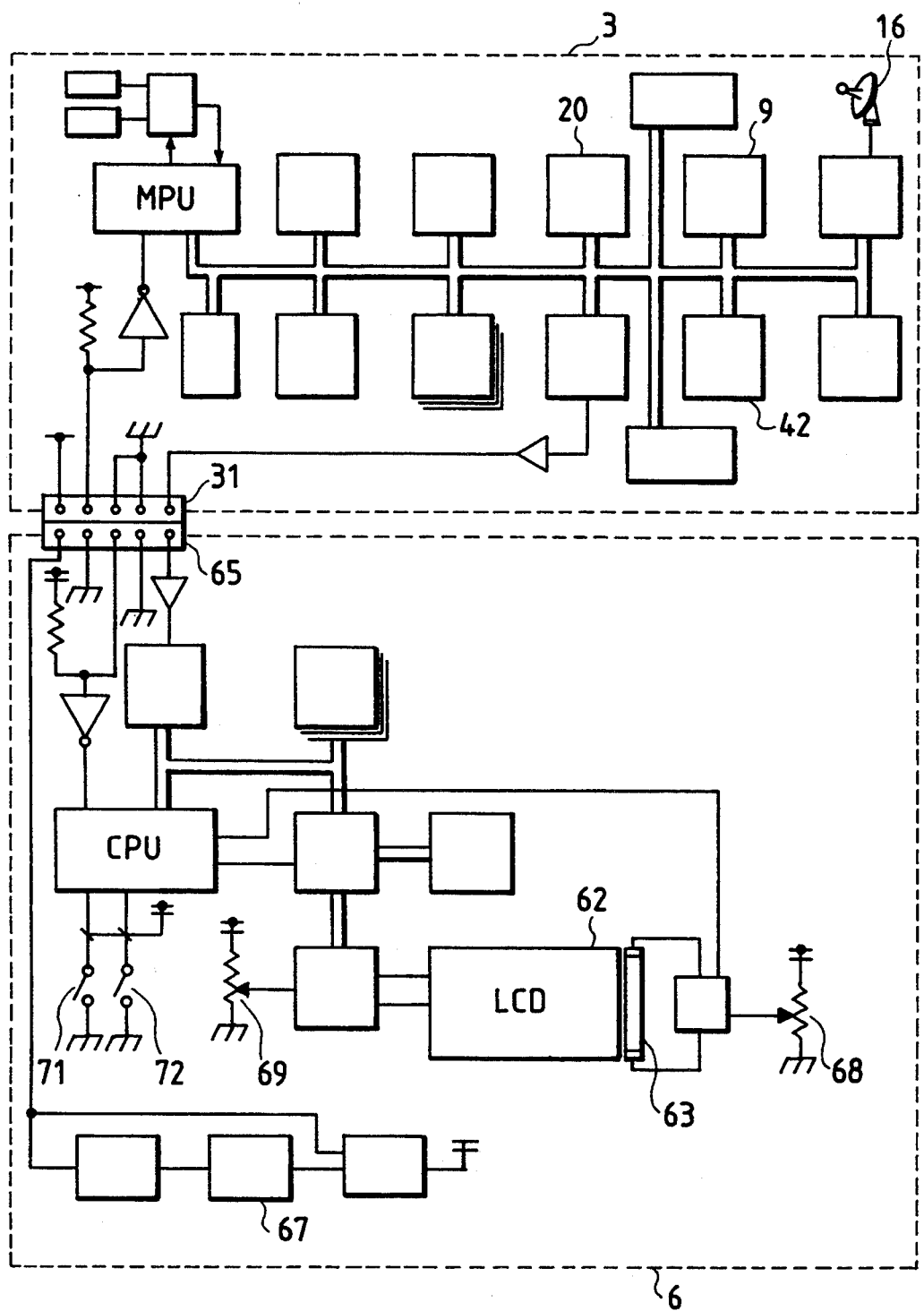
FIG. 3 shows a configuration of the personal computer in the embodiment.

FIG. 3 shows a block diagram of the personal computer. As shown, the personal computer main unit 3 and the display device 6 are interconnected by a main unit connector 31 and a display device connector 65. The personal computer main unit 3 and the display device 6 are configured as shown in FIGS. 4 and 5, respectively.

Figure 4:
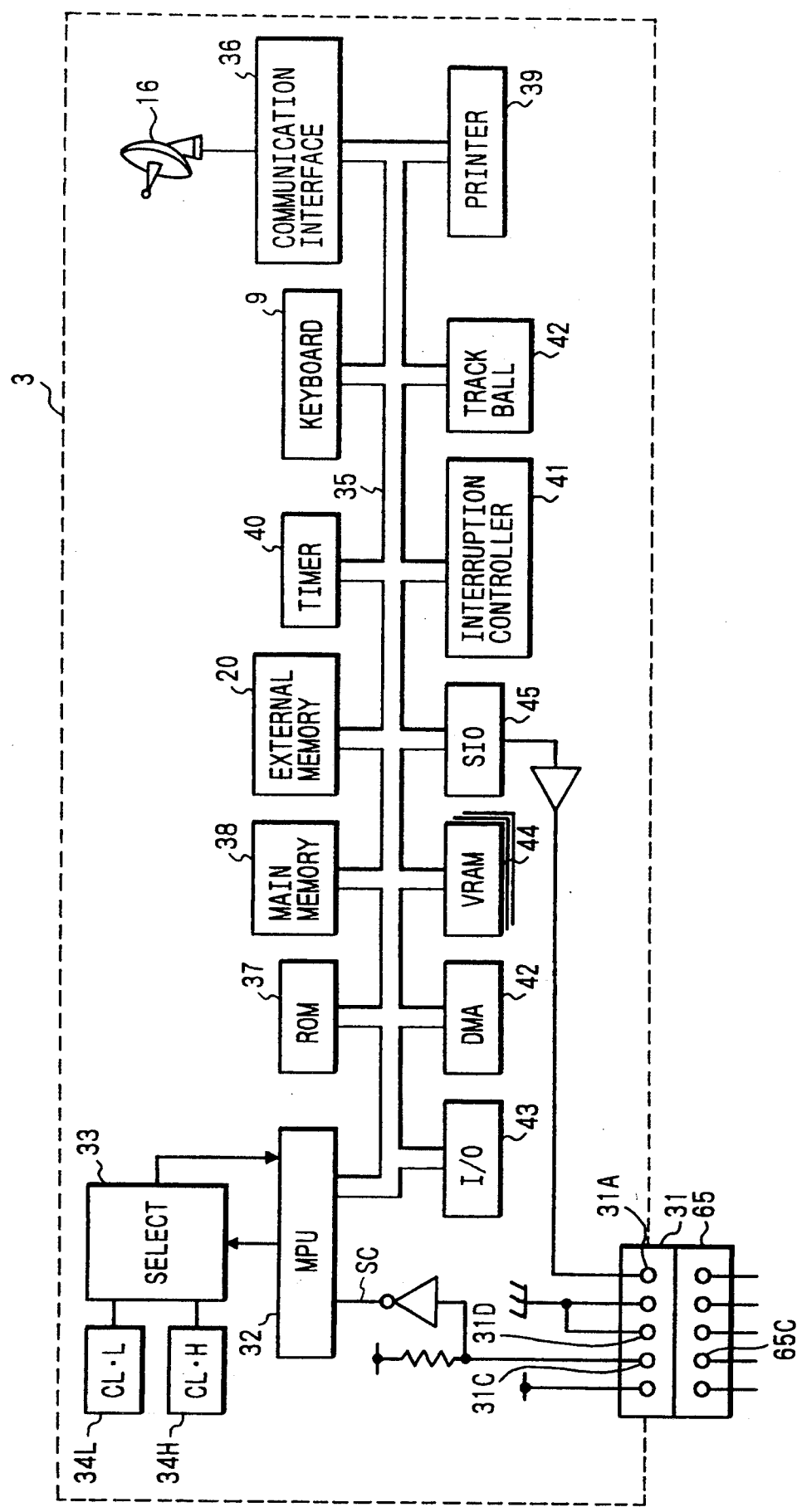
FIG. 4 shows a configuration of a personal computer main unit shown in FIG. 3.

As shown in FIG. 4, the personal computer main unit 3 comprises an MPU 32 which may be Intel 80286 or 80386 and is connected to a 1 MHz low speed clock generator 34L and a 16 MHz high speed clock generator 34H through a clock selector 33. The MPU 32 is connected to an external memory 20 such as an IC card, the keyboard 9, the communication interface 36 connected to the parabola antenna 16 and the track ball 42 through a bus 35, and it is also connected to the following elements. They are a ROM 37 for storing a BIOS, a main memory 38 to be used for an arithmetic operation, a printer 39, a timer 40 for checking the attachment/detachment of the display device 6, an interruption controller 41 for controlling interruption, a DMA (direct memory access) controller 42 and an I/O interface 43 for connecting various I/O devices. The main unit VRAM 44 which is a video memory is read and written exclusively by the MPU 32 and it is of dual structure with a display device video memory to be described later. A serial interface, that is, a main unit SIO 45 is used to transfer data of the main unit VRAM 44 to the display device 6 and it is connected to a transmission pin 31A of the main unit connector 31. In the present embodiment, the serial data transfer is used in order to reduce the number of pins of the connecters 31 and 65 between the personal computer main unit 3 and the display device 6 although parallel data transfer may be used to attain high speed data transfer where the increase of the number of pins is permitted.

Figure 5:
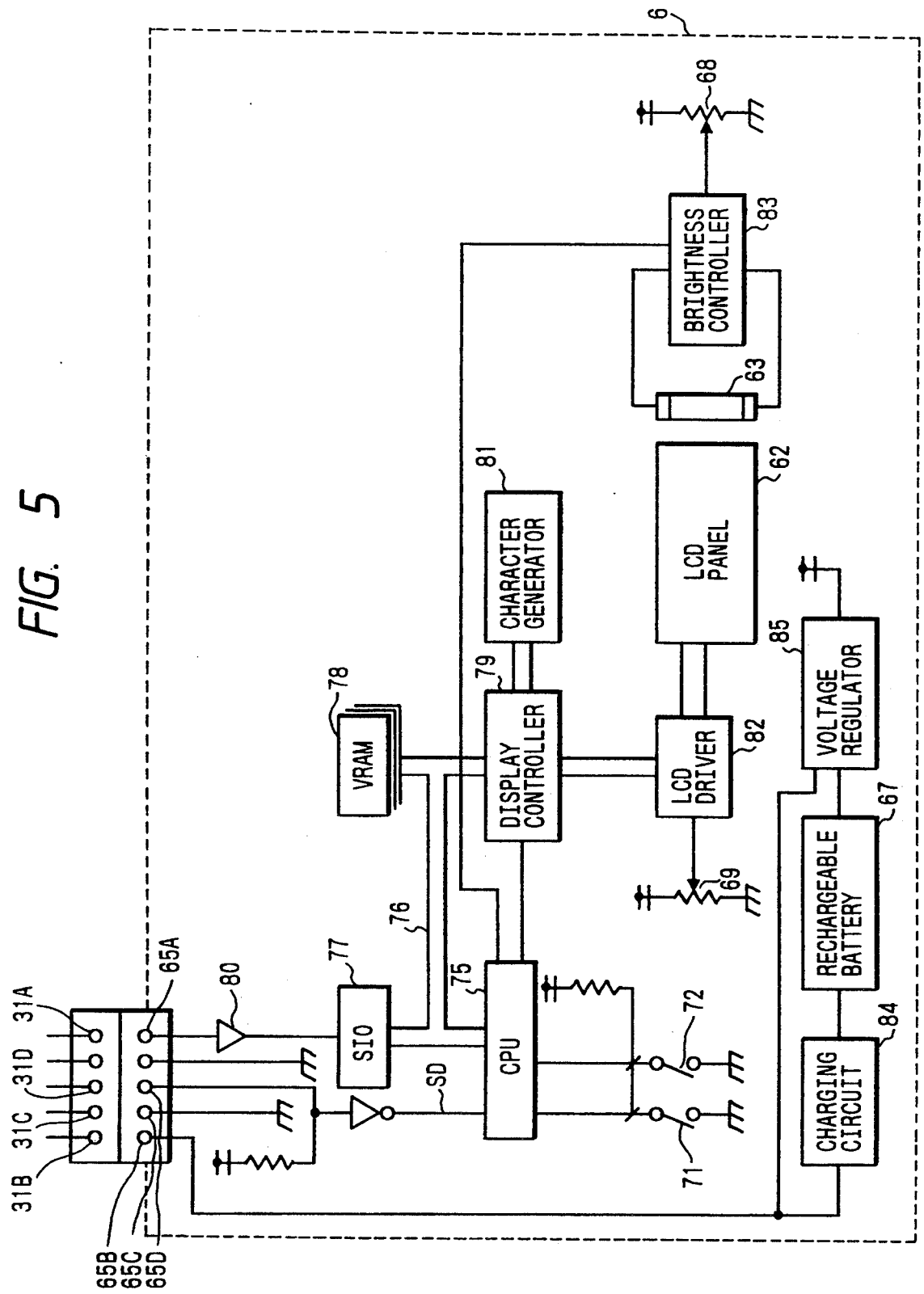
FIG. 5 shows a configuration of the display device shown in FIG. 3.

As shown in FIG. 5, the display device 6 comprises a CPU 75 for controlling communication and managing power saving, and it is connected to a display device SIO 77, a display device VRAM 78 and a display controller 79 through a bus 76. The display device SIO 77 is connected to a reception pin 65A which corresponds to the main unit connector A of the personal computer 3, through a buffer 80 so that the data of the main unit VRAM 44 is transferred to the display device VRAM 78. The display controller 79 is connected to a character generator 81 for generating character codes and also connected to an LCD driver 82 which drives the display panel 62 to control the display of the content of the display device VRAM 78 on the display panel 62. By setting a mode of the CPU 75, the VRAM 78 may store a plurality of screens to display them. When the display device 6 is connected to the personal computer main unit 3, a plurality of screens are stored in accordance with the inputs from the display sw 72 by switching the address of the VRAM 78, and when the display device 6 is detached from the personal computer main unit 3, the address of the VRAM 78 is switched in accordance with the input from the display sw 72 so that the screens are selectively displayed. A brightness controller 83 controls the brightness of the backlight device 63 in accordance with the setting of the backlight controller 68. The contrast of the display panel 62 is controlled by the LCD driver 82 in accordance with the setting of the contrast controller 69. The backlight sw 71 and the display sw 72 are connected to the CPU 75.

The sheet battery 67 is connected to a power supply pin 65B of the reception in 65A through a charge circuit 84, and the power supply pin 65B is connected to a power supply pin 31B of the main unit connector 31. A power supply (not shown) of the personal computer main unit 3 is connected to the power supply pin 31B so that the sheet battery 67 is recharged when the display device 6 is attached. The power of the sheet battery 67 is supplied to the circuits of the display device 6 through a voltage regulator 85. A main unit attachment-/detachment detection pin 31c corresponds to a grounded pin 65c of the reception pin 65A and a display device attachment/detachment detection pin 65D is connected to a grounded pin 31D of the main unit connector 31. Thus, the attachment and the detachment can be independently detected. A detection signal SC of the main unit 3 is inverted and supplied to the MPU 32, and a detection signal SD of the display device 6 is inverted and supplied to the CPU 75.

Functions and operations of the present embodiment are now explained.

The display device 6 has the CPU 75 separately from the personal computer main unit 3 and its own display device VRAM 78. Thus, when the display device is attached to the personal computer main unit 3, it functions as the display means for the personal computer, and when it is detached, it functions as an independent display unit having a memory and a controller. Because the VRAM includes a plurality of planes, the function of the personal computer when the display device 6 is attached, is enhanced. Namely, the processing efficiency and the processing speed of the MPU 32 of the personal computer main unit 3 are enhanced because the MPU 32 may read and write the main unit VRAM 44 at its own timing since the data for the display is read from only the VRAM 78 When the display device 6 is detached from the personal computer main unit 3, it is detected by the detection signal SC of the personal computer main unit 3 and the detection signal SD of the display device 6. In response to those signals, the following switching is performed. In the personal computer main unit 3, the clock selector 33 is activated by a command of the MPU 32 to switch the supply source of clock from the high speed clock generator 34H to the low speed clock generator 34L. In this manner, low power consumption is attained when the display device 6 is not attached. When the display device 6 is reattached, the detection signal SC supplied to the MPU 32 through the inverting buffer changes from a low level to a high level so that the supply source of the clock is switched from the low speed clock generator 34L to the high speed clock generator 34H.

The display device 6 functions in the following manner. Whether the display device is attached to the personal computer main unit 3 or not, the data of the VRAM 78 is read frame by frame by the CPU 75 or the display controller 79 and it is displayed on the display panel 62. When the display device 6 is attached, the VRAM 78 is also updated in parallel by the data from the personal computer main unit 3 by the control of the CPU 75. When it is detached, it is detected by the CPU 75 by the high level of the detection signal SD and the power saving is managed. For example, when the backlight sw 71 is depressed, the backlight device 63 is turned off so that the life of the sheet battery 67 is extended, and when the display sw 72 is depressed, the display by the display panel 62 is turned off so that the life of the sheet battery 67 is extended. In a multi-screen display mode, the display screen is switched each time the display sw 72 is depressed.

Figure 6:
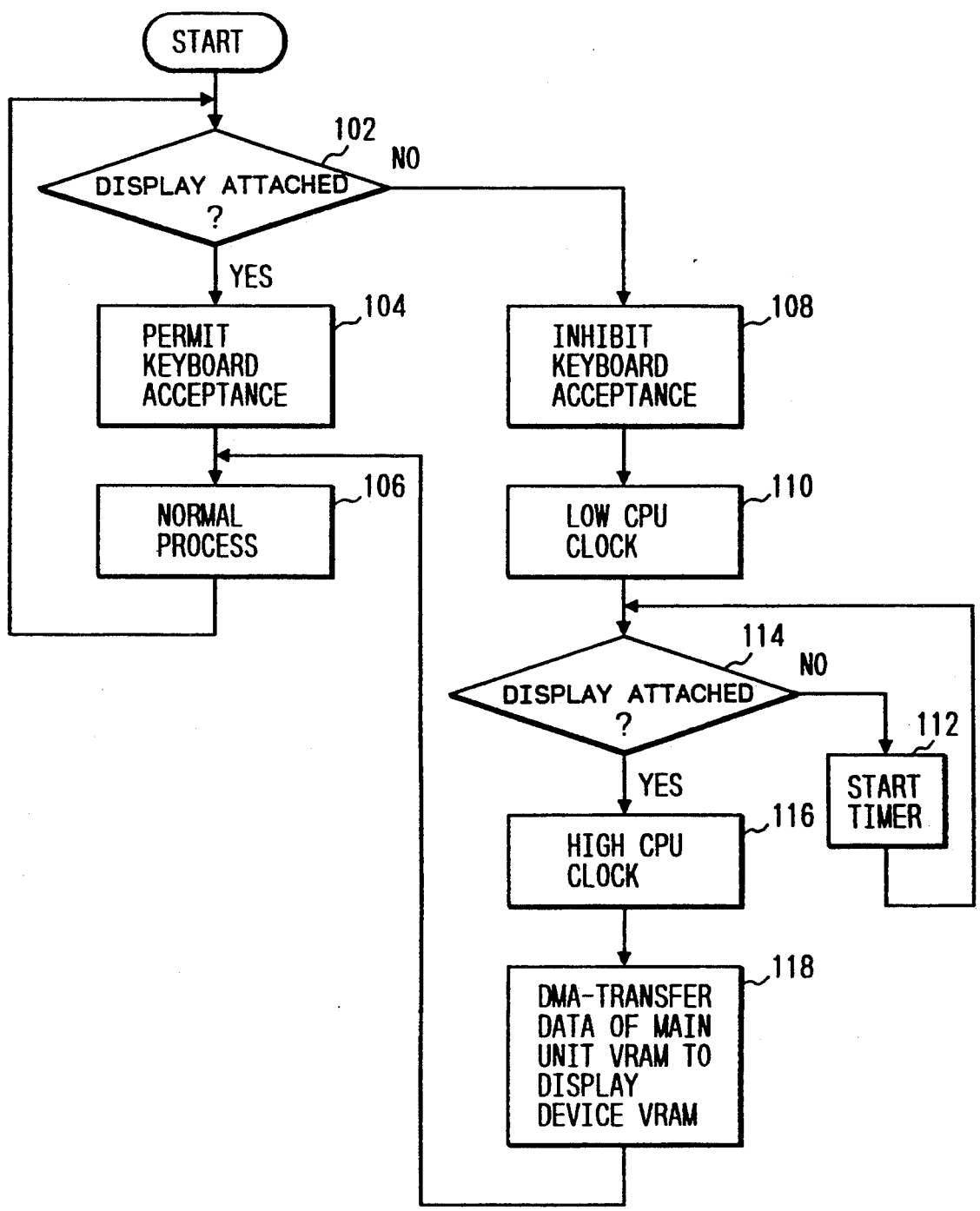
FIG. 6 shows a flow chart of an attachment detachment process.

FIG. 6 shows a flow chart of a process in the attachment/detachment. Whether the display device 6 is attached or not is determined by the detection signal SC(step 102), and when it is attached, the acceptance of the keyboards 9a and 9b is permitted (step 104). A normal process is then carried out (step 106). If the detachment of the display device 6 is detected in the step 102, the acceptance of the keyboards 9a and 9b is inhibited (step 108), and the clock source to the MPU 32 is switched from the high speed clock generator 34H to the low speed clock generator 34L (step 110). The attachment/detachment of the display device 6 is checked at an interval of one second (step 114) by starting a timer 40 (step 112). When the display device 6 is reattached, the clock source is switched to the high speed clock generator 34H (step 116), and the content of the main unit VRAM 44 is transferred to the display VRAM 78 (step 118). In the present embodiment, the display device 6 has the backlight although a display without a backlight may be used to extend a displayable time in the detach mode.

In the present embodiment, a conventional liquid crystal display is used, alternatively, a ferroelectric liquid crystal display may be used. In this case, the display device VRAM may be omitted due to a memory effect of the liquid crystal itself so that the power consumption and the cost can be further reduced.

Effects of the Invention

In accordance with the present invention, when the display device is attached, the data of the main unit is transferred to the display device memory means and stored therein, and when it is detached, it is powered from its own power supply means and the stored data is displayed by the display means. Thus, the portability is significantly enhanced while maintaining high operability. The prepared document or information may be presented by using the detached display device without printing it out. Further, the detached display device may be directly applied to a copying machine to make a number of copies without printing it.

We claim:

1. A computer system comprising:
    a main body having:
        a processor for processing input data received from a source external to the main body;
        a first memory for storing display data processed by said processor; and
        a first connector for transferring said display data to a source external to the main body;
    a display device attachable to and detachable from said main body, said display device having:
        a display panel;
        a second connector, connected to said first connector when said display device is attached to said main body, for transferring said display data to a source internal to the main body;

a second memory storing said display data received through said second connector;

a display controller for controlling the display; and a power supply means for supplying power to each of said display panels, said second memory and said display controller.

2. A computer system according to claim 1 wherein said display device further includes first detection means for detecting whether the display device is attached to and the detached from said main unit.

3. A computer system according to claim 2 wherein said display device includes a liquid crystal display panel including a backlight device for back illumination and a liquid crystal display driver for performing the display control.

4. A computer system according to claim 3 wherein said liquid crystal display panel includes a ferroelectric liquid crystal display panel.

5. A computer system according to claim 2 wherein said display device further includes management means for managing the on-off control of said backlight device or said liquid crystal display device.

6. A computer system according to claim 2 wherein said first detection means detects whether the display device is attached to or detached from said main body by detecting the presence or absence of a predetermined voltage on said second connector.

7. A computer system according to claim 2 wherein said display device includes a liquid crystal display panel including a backlight device for back illumination and a liquid crystal display driver for performing the display control.

8. A computer system according to claim 1 wherein said main body further includes second detection means for detecting whether said main body is attached to or detached from said display device.

9. A computer system according to claim 8 wherein said second detection mans detects whether said main body is attached to or detached from said display device by detecting the presence or absence of a predetermined voltage on the second connector.

10. A computer system according to claim 8 wherein said main body further includes switching means for changing the speed of an operation clock associated with the processor when said second detection means detects a detachment of said main body from said display device.

11. A computer system according to claim 10 wherein said main body further includes keyboard means for inputting data to said processor.

12. A computer system according to claim 11 wherein said main body further includes inhibit means for inhibiting input data from said key board, wherein said inhibit means inhibits said input data and said switching means changes said operation clock speed from a relatively high speed to a relatively low speed when said second detection means detects that said main body is detached from said display means.

13. A computer system according to claim 11 wherein said main body transfers display data to said display when said second detection means detects that said main body is attached to said display device, thereafter said inhibit means permits data input from said keyboard means and said switching means changes the operation clock speed of said processor from a relatively low speed to a relatively high speed.

14. A computer system according to claim 1 wherein said first memory is a video memory for storing display data processed by said processor, and said second memory is a video memory for storing the display data in said first memory transferred through said first and second connectors.

15. A computer system according to claim 1 wherein said power supply means includes a rechargeable battery and charge means for recharging said power supplied from a source external to the display device when said display device is attached to said main body.

16. A computer system according to claim 1 wherein said main body is essentially rectangular and thin, and has a cover pivotably coupled to an edge thereof by a hinge, said cover being attachable to and detachable from said display device.

17. A computer System according to claim 1 wherein said display device includes a liquid crystal display panel including a backlight for back illumination and an LCD driver for controlling the display.

18. A computer system according to claim 1 wherein said second memory is capable of storing a plurality of screen data to be displayed on said display panel, and said display controller selectively displays one of the plurality of screen data on said display means.

* * * * *